Dec. 11, 1951          P. T. NIMS          2,578,147
FUEL FEEDING SYSTEM FOR INTERNAL-COMBUSTION ENGINES
Filed June 28, 1946          3 Sheets-Sheet 2
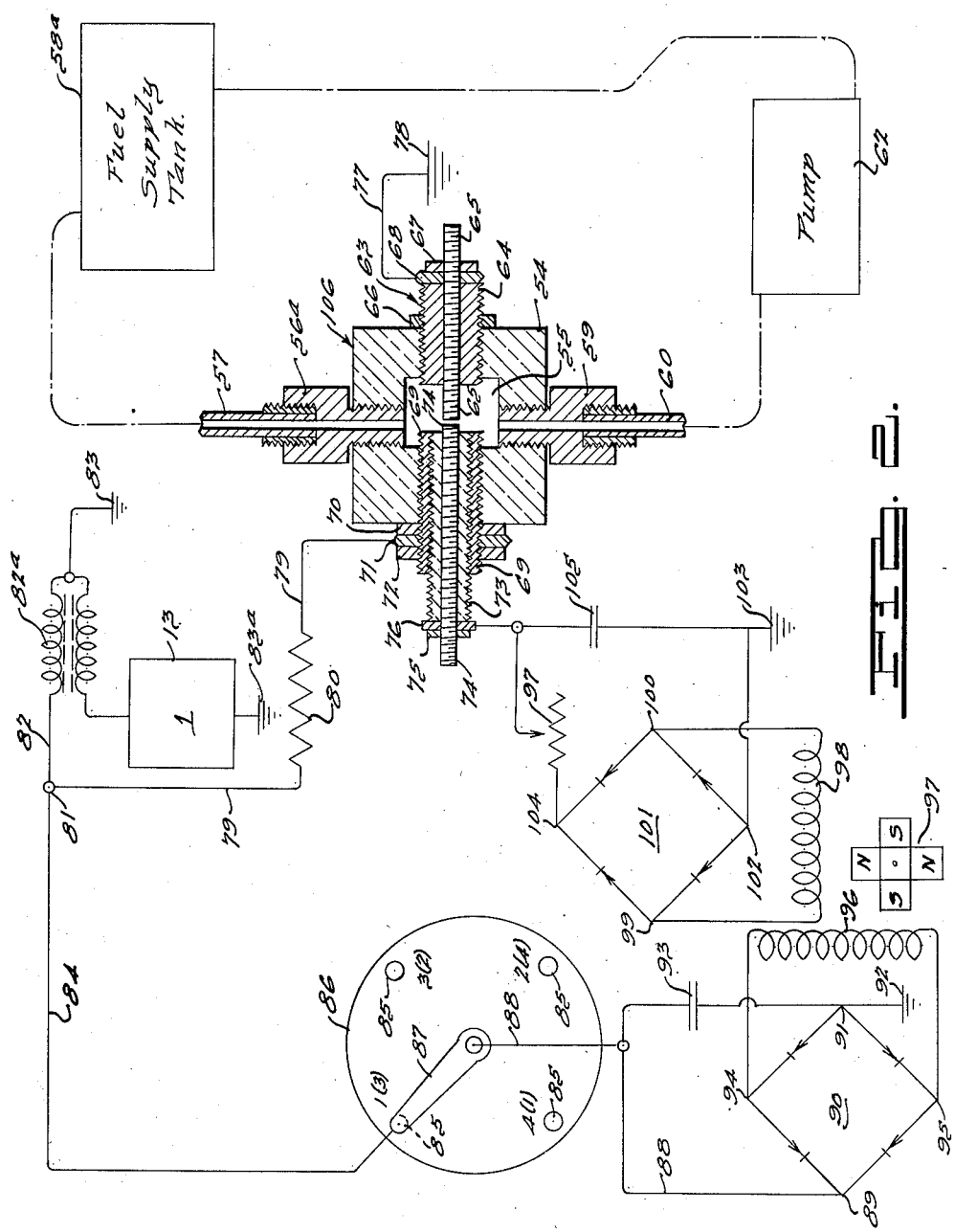
INVENTOR.
Paul T. Nims.
BY
Harness and Harris
ATTORNEYS.

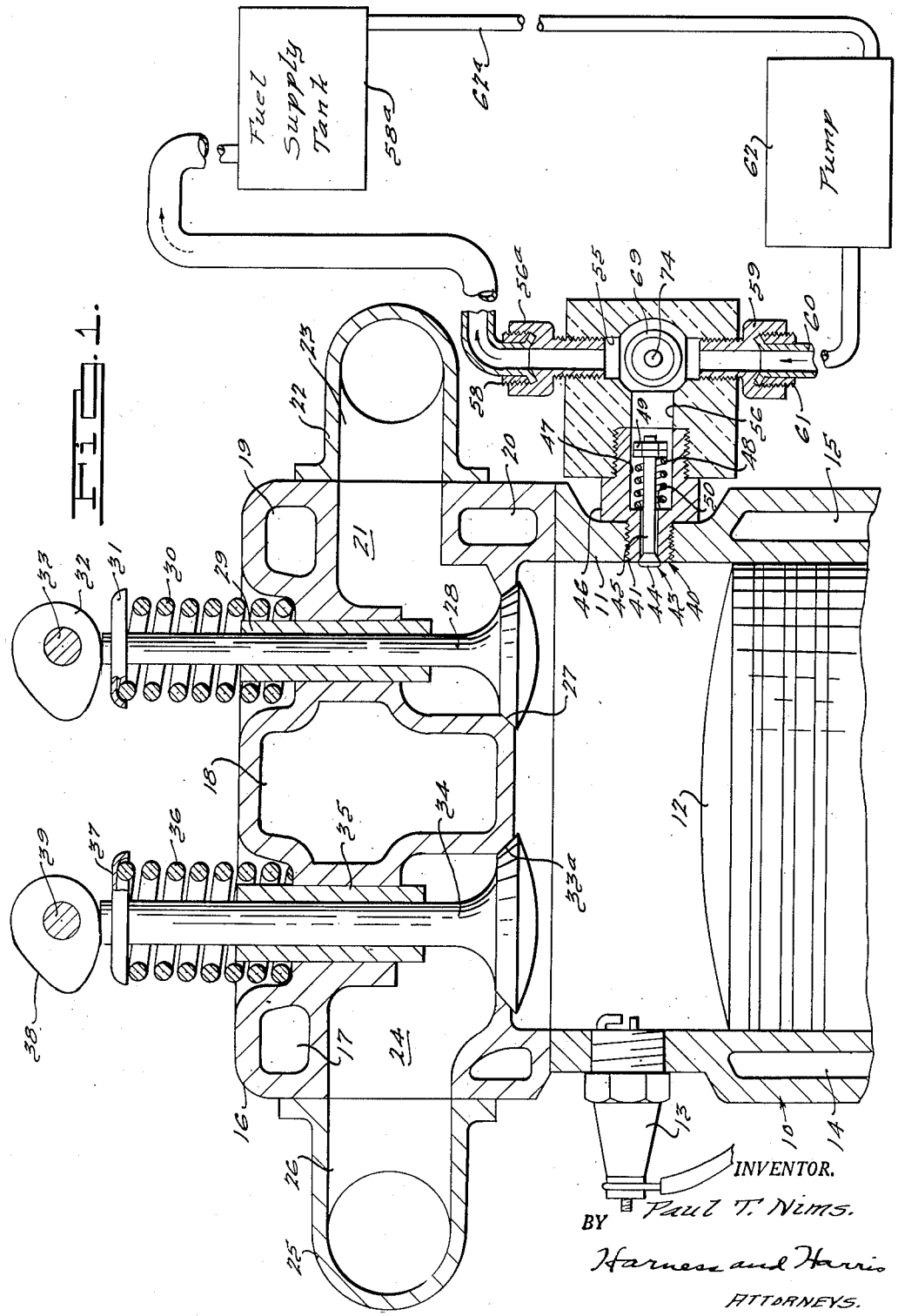

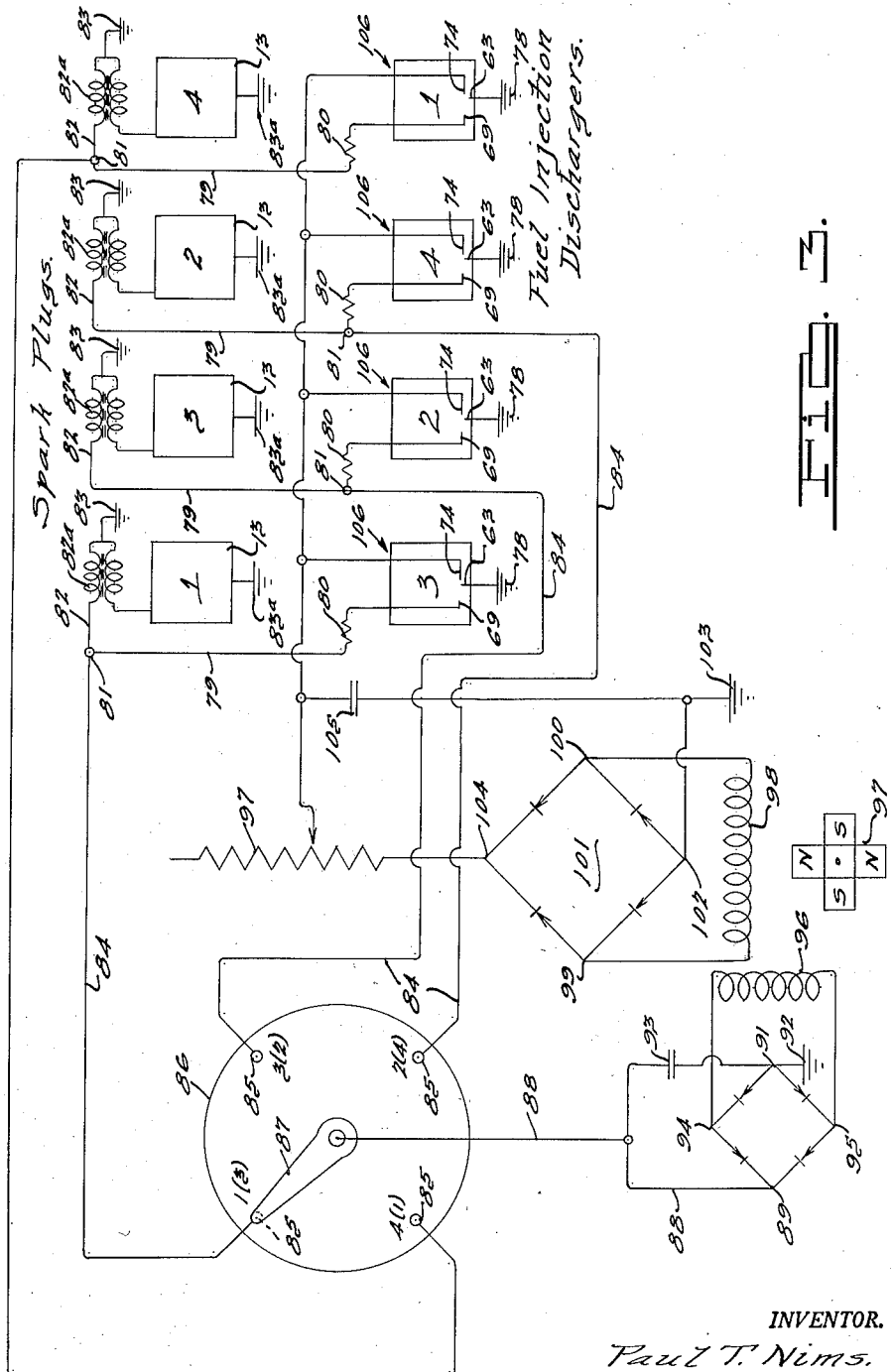

Patented Dec. 11, 1951

2,578,147

UNITED STATES PATENT OFFICE 2,578,147

FUEL FEEDING SYSTEM FOR INTERNAL-COMBUSTION ENGINES

Paul T. Nims, Detroit, Mich., assignor to Chrysler Corporation, Highland Park, Mich., a corporation of Delaware Application June 28, 1946, Serial No. 680,190

11 Claims. (Cl. 123—136)

This application relates to a method and apparatus for increasing the pressure of a body of liquid. More specifically it involves the use of such pressure increase for effecting injection of liquid fuel in an engine.

An object of the present invention is to provide improvements in the arrangement of electrodes employed for effecting an electrical discharge within a body of liquid to increase its pressure. My invention is applied to an apparatus comprising a container or conduit means for liquid and electrodes arranged therein for discharging in the liquid, and I have been able to obtain a novel and very effective arrangement of these electrodes.

Another object is to provide improvements in electrical circuits for connecting electrodes positioned within liquid fuel for injecting the fuel in an engine, with a conventional distributor and spark plugs for igniting the fuel in the engine.

Other objects will appear from the disclosure.

In the drawings:

Fig. 1 is a sectional view through an engine showing the novel injection apparatus of the present invention;

Fig. 2 is a sectional view through a portion of the injection apparatus and includes the electrical apparatus connected therewith; and Fig. 3 is a diagrammatic view of parts of the fuel injection apparatus for all the cylinders of an engine and of the distributor and spark plugs of the engine.

As seen in Fig. 1 the engine includes a cylinder block 10 in which is formed a cylinder 11. The piston 12 is slidably mounted in the cylinder 11. A spark plug 13 extends through one side of the cylinder wall. Passages 14 and 15 are formed in the block for circulation of a cooling fluid. A head 16 is suitably attached to the block 10 and has passages 17, 18, 19, and 20 formed therein for circulation of the cooling fluid. An air intake passage 21 is formed in the head 16, and an air intake manifold 22 is attached to the head with the passage 23 formed therein communicating with the passage 21 in the head. An exhaust passage 24 is formed in the head 16, and an exhaust manifold 25 is attached to the head with a passage 26 therein in communication with the passage 24. At the top of the cylinder 11 a seat 27 is formed, which is engaged by an inlet valve 28 opening and closing the air intake passage 21. The inlet valve 28 is slidable in a sleeve 29 suitably mounted in the head 16. A coil spring 30 acting between a recess formed in the top of the head 16 and a collar 31 on the valve 28 acts to maintain the valve against the seat 27. The end of the valve 10 is engaged by a cam 32 secured to a shaft 33. A seat 33ª is formed in the end of the exhaust passage 24 adjacent the end of the cylinder 11. An exhaust valve 34 engages the seat and is slidable in a sleeve 35 suitably mounted in the head 16. A coil spring 36 acting between a recess formed in the head 16 and a collar 37 attached to the valve 34 urges the valve 34 against the seat 33. The end of the stem of the valve 34 is engaged by a cam 38 secured to a shaft 39.

An injection nozzle 40 is threaded through the wall of the cylinder 10. This nozzle includes a sleeve 41 and a valve 43 having a head 44 engaging the inner end of the sleeve 41 and a stem portion 45. The outer end of the sleeve 41 is enlarged as indicated at 46, and the bore at this portion is enlarged as indicated at 47. A coil spring 48 is held on the valve 43 by means of a pair of nuts 49, the coil spring acting between the nuts and a shoulder 50 formed in the bore in the nozzle sleeve 41. A flange 52 on the sleeve 41 limits the inward adjustment of the sleeve in the cylinder wall by engaging the cylinder wall. The sleeve 41 may be adjusted inwardly and outwardly of the cylinder 11 because of the extended threaded portion 42 formed on the sleeve. A threaded extension 53 on the nozzle sleeve 41 connects the nozzle sleeve with a fibre block 54. A through passage 55 is formed in the block 54. A side passage 56 is also formed in the block and intersects the through passage 55 at a central region thereof, the side passage 56 being in communication with the enlarged portion 47 of the nozzle sleeve bore. As contributes to the unobstructed flow away from said block, a smooth-bore fitting 56ª is threaded into the upper end of the through passage 55 and may receive the open flared end of a through tube 57. A fitting 58 clamps the open flared end of the tube 57 in the fitting 56. The tube 57 leads directly and unobstructed to a fuel tank 58ª. A fitting 59 is threaded in the lower end of the through passage 55 and the flared end of a tube 60 is clamped in the fitting 59 by a fitting 61. The tube 60 extends to the discharge side of a pump 62. A tube 62ª extends from the fuel supply tank 58ª to the inside of the pump 62.

As seen in Fig. 2 a compound electrode 63 is mounted in the fibre block 54. The compound electrode comprises a sleeve 64 and a rod 65 contained therein. The rod 65 and sleeve 64 project into the intersection of the through passage 55 and the side passage 56, which intersection is spherically formed, the rod 65 projecting well beyond the tube 64. The sleeve 64 is threaded in the block 54, and its position is determined by a lock nut 66. The rod 65 is threaded in the sleeve 64 and its position with respect to the sleeve is fixed by a nut 67 clamping an electrical connector 68 to the rod and sleeve. A shell electrode 69 is threaded in the fibre block 54 and projects into the intersection of the passages 55 and 56 formed in the block so as to be in opposed and relatively widely spaced relation to the sleeve 64 of the compound electrode 63. The position of the sleeve 69 in the block 54 is fixed by a lock nut 70. An electrical connector 71 is held clamped on the shell electrode 69 between the nut 70 and a nut 72. An insulating sleeve 73 is threaded in the shell electrode 69, and a rod electrode 74 is threaded in the insulating sleeve 73. The rod electrode projects into the inner section of the passages 55 and 56 formed in the block somewhat beyond the shell electrode 69 into opposed and relatively closely spaced relation to the rod 65 of the compound electrode 64. A nut 75 clamps an electrical connector 76 on the rod electrode 74 against the end of the insulating sleeve 73.

A conductor 77 leads from the electrical connector 68 attached to the compound electrode 63 to a ground 78. A conductor 79 leads from the electrical connector 71 to an impedance 80 and thence to a connection point 81. A conductor 82 leads from the connection point 81 to the primary coil of a powdered-iron-core transformer 82a, which is grounded between primary and secondary coils as indicated at 83. The secondary coil is connected to the spark plug 13, which is grounded as indicated at 83a. A conductor 84 leads from the connection point 81 to a contact 85 of a distributor 86 having a rotatable distributor arm 87 shown in engagement with the contact 85. The distributor arm is connected to a conductor 88 which leads to a terminal 89 of a rectifier 90, the opposite terminal 91 of which is grounded as indicated at 92. A capacitor 93 is connected across the terminals 89 and 91 of the rectifier 90. The other two terminals 94 and 95 of the rectifier are connected to a winding 96. A magnetic rotor 97 of the multipolar permanent type is positioned adjacent the winding 96 so as to generate in the winding a high voltage of the order of 10,000 to 30,000 volts. The winding and the rotor together with a winding 98 constitute a compound magneto. A potential of 1,000 to 5,000 volts is to be generated on the winding 98. This winding is connected to opposed terminals 99 and 100 of a rectifier 101. One remaining terminal 102 of the rectifier 101 is grounded as indicated at 103, and the other remaining terminal 104 is connected by a variable resistance 97 with the connector 76 on the electrode 74. A capacitor 105 is connected between the connector 76 and the terminal 102.

It will be seen that the potential between the sleeve electrode 69 and the compound electrode 63 is the same as that across the primary coil of the transformer 82, i. e., 10,000 to 30,000 volts. Since the potential across the spark plug 13 should be 6,000 to 12,000 volts, the transformer 82a will be so constructed and arranged as to reduce voltage rather than to increase it at most times, although at times it will simply effect little or no change in the voltage depending upon the voltage required across the electrodes 65 and 69 as against that needed for the spark plug. The impedance 80 and the impedance of the transformer 82a insure that there be sufficient voltage both across the spark plug and between the shell electrode 69 and the compound electrode 63. In addition, the transformer permits a desirable oscillation effect to occur. Let it be assumed that the engine of which one cylinder and its associated parts are shown in Fig. 1 has four cylinders, and that their firing order is 1—3—2—4 as indicated by the row of spark plugs 13 illustrated diagrammatically in Fig. 3. This firing order for the spark plugs is insured by the distributor 86, the contacts 85 thereof being connected with the appropriate spark plugs. The numeral 1, 2, 3, or 4 associated with each contact 85 and not in parenthesis is the contact for the spark plug designated by the numeral. The numerals in parenthesis at the contacts 85 designate the structures shown in detail in Fig. 2 and associated with the various cylinders. Each such structure will now be called the fuel injection discharger and will be designated by the reference character 106. Consider now that the spark plug 13 for cylinder No. 1 is being fired as the position of the distributor arm 87 in Figs. 2 and 3 illustrates the spark plug for this cylinder is fired because the voltage across the capacitor 93 is impressed upon the spark plug in multiplied form by way of the transformer 82. At this time the voltage across the capacitor 93 exists between the shell electrode 69 and the compound electrode 63 of the fuel injection discharger for cylinder No. 3. These electrodes are in a supply of fuel passing continuously from the fuel supply tank 58 through the conduit 62a, the pump 62, the conduit 60, the passage 55 in the fibre block 54, and the conduit 57 back to the fuel supply tank 58. An electrical discharge occurs between the shell electrode 69 and the rod 65 of the compound electrode 63 which are relatively widely spaced and this initiates an electrical discharge between the rod electrode 74 and the rod 65 of the compound electrode 63 which are relatively closely spaced. This is the main discharge, since the capacitor 105 will be of many times the size of the capacitor 93, and thereby enables this discharge to involve the greater energy. The initial discharge is made to take place at the outer shell electrode 69, rather than at the rod electrode 74 because the bubble of gas forming with initial discharge is more likely to find its way from the shell electrode 69 to the rod electrode 74 and will more nearly occupy the relatively small space between the two rod electrodes 65 and 74 than the relatively large space between the shell electrode 69 and the rod electrode 65. The bubble of gas thus occupying all or nearly all of the space between the two rod electrodes makes the electrical discharge between these electrodes occur more easily. The adjustable rheostat 97 serves to vary the rate of discharge between the rod or main electrode 74, and the rod electrode 65. The electrical discharge occurring between the aforesaid electrodes causes the formation of gas thereat perhaps either by a partial cracking of the fuel or by vaporization thereof through heat to increase the pressure of the fuel very considerably. If the coil spring 48 causing the nozzle valve 44 to hold the nozzle sleeve 41 closed is appropriately regulated, the increased pressure, confined in a sense by the very inertia of the columns of fluid merging in passage 55 such that it acts primarily on the relatively unresisting increment of the fuel in 56 will be sufficient to make the nozzle valve open the valve sleeve and permit discharge of fluid through the nozzle into cylinder No. 3. The rate of discharge across electrodes 65 and 74 as determined by the adjustment of the rheostat 97 determines the extent of increase in pressure of the liquid fuel and accordingly the amount of fuel discharged. The evanescent increase in pressure lasts only long enough for the required injection of fuel through the nozzle 40 into the engine cylinder. A great portion of any gaseous products formed by the electrical discharge are injected into the engine cylinder with great advantage, for these gaseous products are very satisfactory as a fuel. The continuous circulation of the fuel from the supply tank causes any gaseous products not injected in the engine cylinder and solid residue to be carried off through the conduit 57 and thereby scavenges the space between the electrodes for conditioning for the next electrical discharge. The voltage between the rod electrodes 65 and 74 exist at all times since, as is evident from Figs. 2 and 3, the rod electrode 74 is independent of the distributor 85. However, this voltage is low enough and the spacing between the rod electrodes 74 and 65 is great enough that an electrical discharge between them cannot occur without an electrical discharge between the shell electrode 69 and the rod electrode 65.

As previously stated, spark plug No. 1 is fired at the same time as the electrical discharge is effected in the No. 3 fuel injection discharger. Discharge of the No. 3 apparatus produces injection of fuel in the No. 3 cylinder and thereafter the No. 3 spark plug is fired. At this time, as indicated by Fig. 3, the No. 2 fuel injection discharger is being fired and causes the injection of fuel in No. 2 cylinder. Thereafter the No. 2 spark plug fires and at this time the No. 4 fuel injector operates. Thereafter the No. 4 spark plug fires and at this time the No. 1 fuel injector operates. Then the cycle is repeated. The fuel injection system of the present invention has been shown as applied to an engine of the type in which ignition is effected by spark plugs. The present fuel injection system is of great advantage when employed with spark plug ignition because the electrical systems of the two may be combined and common parts may be used, for example, the distributor and the magneto. However, it is to be understood that a fuel injection system of the present invention is not limited to use with engines having spark plug ignition, but may be just as well applied to engines, for example, of the diesel type having compression-ignition. The invention may also be applied in the injection of fuel in an engine manifold. It is also to be stated at this point that the present invention is not limited in its use to fuel injection for an engine but is particularly applicable to other installations wherever discharge of a liquid may be employed.

As previously stated, one result of the injection by electrical discharge in a liquid fuel is the cracking of the fuel. If the fuel is gasoline, the gaseous products along with the liquid products are injected in the engine. Both liquid and gaseous products may have higher octane rating, because the residue formed as the result of the cracking is carbon. Thus it is clear that the gasoline resulting from the cracking has had some of its carbon removed and in effect, its hydrogen increased. This may mean a higher octane rating. With the cracking and injecting of the fuel carried on together, there is no substantial loss of gaseous products normally resulting from cracking.

The intention is to limit the invention only within the scope and spirit of the appended claims.

I claim:

1. In apparatus for increasing the pressure of a contained mass of fluid to effect the spark-injection thereof, the combination with a first electrode, a shell electrode facing the first electrode in relatively widely spaced relation thereto, a rod electrode positioned in the shell electrode in spaced and insulated relation thereto and projecting therebeyond in closely spaced relation to the first electrode, and apposite means for creating an electrical discharge between the first electrode and the shell electrode, of means for causing the said electrical discharge to initiate a significant electrical discharge between the first electrode and the rod electrode, all the electrodes being in the mass of fluid.

2. In apparatus for creating a spark in a contained mass of liquid, characterized by a first electrode in the liquid, an outer electrode in the liquid facing the first electrode in spaced relation thereto, an inner electrode in the liquid positioned within the outer electrode in spaced relation thereto and facing the first electrode, means for applying a relatively low electric potential across the inner and first electrodes, and means for applying a relatively high electric potential across the outer and first electrodes to create an electrical discharge therebetween for causing the relatively low electric potential to create an electrical discharge between the inner and first electrodes.

3. In apparatus for increasing the pressure of a contained mass of fluid to effect the spark-ignition thereof, the combination with a first electrode, a shell electrode facing the first electrode in relatively widely spaced relation thereto, a rod electrode positioned in the shell electrode in spaced and insulated relation thereto and projecting therebeyond in closed spaced relation to the first electrode, and apposite means for creating an electrical discharge between the first electrode and the shell electrode, of means for causing the said electrical discharge to initiate a significant discharge between the first electrode and the rod electrode, all the electrodes being in the mass of fluid, said last mentioned means including capacitor means having a charging voltage adjustment wherewith may be variably impressed a potential difference to exist across the first and rod electrodes and to supply said electrical discharge therebetween.

4. In apparatus for increasing the pressure of a contained mass of fluid to effect the spark-ignition thereof, the combination with a first electrode, a shell electrode facing the first electrode in relatively widely spaced relation thereto, a rod electrode positioned in the shell electrode in spaced and insulated relation thereto and projecting therebeyond in closely spaced relation to the first electrode, and apposite means for creating an electrical discharge between the first electrode and the shell electrode, of means for causing the said electrical discharge to initiate a significant discharge between the first electrode and the rod electrode, all the electrodes being in the mass of fluid, such that the discharge created in the fuel by said apposite means is attended by inherent bubble formation therein, said electrodes being constructed and arranged whereby said bubble formation tends to contribute toward instigation of said significant discharge.

5. An electrical circuit for injecting and igniting liquid fuel comprising a fuel injection means including an electrode set mounted in a contained mass of the liquid fuel including a first electrode and a second electrode spaced from the first electrode comprising concentrically arranged, spaced, outer and inner electrode members, a first capacitor connected to the inner electrode member, a source of charging power for the first capacitor for continuously impressing a relatively low voltage between the inner electrode member and the first electrode, a second capacitor, circuit means connecting said second capacitor to said source of charging power and to the outer electrode member to impress a relatively high voltage between the outer electrode member and the first electrode, a fuel ignition means comprising a spark plug, a branch circuit connecting said spark plug to said circuit means and arranged to divide the charge of the second capacitor between the spark plug and the outer electrode member respectively, and a plurality of impedances one of which is in said branch circuit and connected to the spark plug and another of which is in said circuit means and connected to the outer electrode member, the said impedances insuring the necessary high voltage for firing the spark plug and obtaining an electrical discharge between the first electrode and the outer electrode member.

6. An electrical circuit for injecting and igniting liquid fuel comprising a fuel injection means including an electrode set mounted in a contained mass of the liquid fuel, said electrode set including a first electrode, a second electrode spaced from the first electrode comprising telescopically arranged, spaced, outer and inner electrode members, a source of electrical energy, a first capacitor connected to the source of electrical energy and to the inner electrode member to provide means for continuously impressing a relatively low voltage between the inner electrode member and the first electrode, a second capacitor, circuit means connecting the second capacitor to the source of electrical energy and to the outer electrode member to provide means for impressing a relatively high voltage between the outer electrode member and the first electrode, fuel ignition means comprising a spark plug connected to said circuit means and arranged in parallel with the outer electrode member, and a plurality of impedances one of which is connected to the spark plug and another of which is connected to the outer electrode member, the said impedances insuring the necessary high voltage for firing the spark plug and obtaining an electrical discharge between first electrode and the outer electrode member.

7. An electrical circuit for injecting and igniting liquid fuel comprising a fuel injection means including an electrode set mounted in a contained mass of the liquid fuel, said electrode set including a first electrode, a second electrode spaced from the first electrode comprising telescopically arranged, spaced, outer and inner electrode members, a source of electrical energy, a first capacitor connected to the source of electrical energy and to the inner electrode member to provide means for continuously impressing a relatively low voltage between the inner electrode member and the first electrode, a second capacitor, circuit means connecting the second capacitor to the source of electrical energy and to the outer electrode member to provide means for impressing a relatively high voltage between the outer electrode member and the first electrode, fuel ignition means comprising a spark plug connected to said circuit means and arranged in parallel with the outer electrode member, a plurality of impedances one of which is connected to the spark plug and another of which is connected to the outer electrode member, the said impedances insuring the necessary high voltage for firing the spark plug and obtaining an electrical discharge between the first electrode and the outer electrode member, and make and break control means in said circuit means for controlling discharge of said second electrode and said spark plug.

8. An electrical circuit for injecting and igniting liquid fuel comprising a fuel injection means including an electrode set mounted in a contained mass of the liquid fuel including a first electrode and a second electrode spaced from the first electrode comprising concentrically arranged, spaced, outer and inner electrode members, a first capacitor connected to the inner electrode member, a source of charging power for the first capacitor for continuously impressing a relatively low voltage between the inner electrode member and the first electrode, a second capacitor, circuit means connecting said second capacitor to said source of charging power and to the outer electrode member to impress a relatively high voltage between the outer electrode member and the first electrode, a fuel ignition means comprising a spark plug, a branch circuit connecting said spark plug to said circuit means and arranged to divide the charge of the second capacitor between the spark plug and the outer electrode member respectively, a plurality of impedances one of which is in said branch circuit and connected to the spark plug and another of which is in said circuit means and connected to the outer electrode member, the said impedances insuring the necessary high voltage for firing the spark plug and obtaining an electrical discharge between the first electrode and the outer electrode member, and make and break control means in said circuit means for controlling discharge of said second electrode and said spark plug.

9. An electrical circuit for injecting and igniting fuel in a plurality of chambers comprising a fuel injection means for each chamber including an electrode set mounted in a contained mass of the liquid fuel including a first electrode, a second electrode spaced from the first electrode comprising concentrically arranged, spaced, outer and inner electrode members, a first capacitor, means connecting the first capacitor to each of the inner electrode members, a source of charging power for the first capacitor for continuously impressing a relatively low voltage between the inner electrode member and the first electrode of each set, a second capacitor, circuit means connecting the second capacitor to said source of charging power and to the outer electrode member of each set to impress a relatively high voltage between each outer electrode member and each first electrode, a fuel injection means for each chamber comprising a spark plug, branch circuit means connecting each spark plug to the circuit means to divide the charge of the second capacitor between the outer electrode and the spark plug, the spark plug of each chamber having an impedance connected thereto and the outer electrode member of the electrode set of each chamber having an impedance connected thereto, the said impedances insuring the necessary high voltage for firing the spark plugs associated with each chamber and obtaining an electrical discharge between the first electrode and the outer electrode member of each set, and make and break circuit control means associated with the said circuit means arranged to simultaneously effect ignition of the fuel in one chamber while effecting fuel injection in another chamber.

10. An electrical circuit for injecting and igniting liquid fuel comprising a fuel injection means including an electrode set mounted in a contained mass of the liquid fuel including a first electrode and a second electrode spaced from the first electrode comprising concentrically arranged, spaced outer and inner electrode members, a first capacitor connected to the inner electrode member, a source of charging power for the first capacitor for continuously impressing a relatively low voltage between the inner electrode member and the first electrode, a second capacitor, circuit means connecting said second capacitor to said source of charging power and to the outer electrode member to impress a relatively high voltage between the outer electrode member and the first electrode, a fuel ignition means comprising a spark plug, a branch circuit connecting said spark plug to said circuit means and arranged to divide the charge of the second capacitor between the spark plug and the outer electrode member respectively, a plurality of impedances one of which is in said branch circuit and connected to the spark plug and another of which is in said circuit means and connected to the outer electrode member, the said impedances insuring the necessary high voltage for firing the spark plug and obtaining an electrical discharge between the first electrode and the outer electrode member, and make and break control means in said circuit means to cause intermittent electrical discharge between said outer electrode member and said first electrode whereby the contained mass of liquid fuel between said inner electrode member and said first electrode is intermittently conditioned for spark discharge therebetween which discharge pressurizes said fuel and effects injection thereof.

11. An electrical circuit for injecting and igniting liquid fuel comprising a fuel injection means including an electrode set mounted in a contained mass of the liquid fuel including a first electrode and a second electrode spaced from the first electrode comprising concentrically arranged, spaced outer and inner electrode members, a first capacitor connected to the inner electrode member, a source of charging power for the first capacitor for continuously impressing a relatively low voltage between the inner electrode member and the first electrode, a second capacitor, circuit means connecting said second capacitor to said source of charging power and to the outer electrode member to impress a relatively high voltage between the outer electrode member and the first electrode, a fuel ignition means comprising a spark plug, a branch circuit connecting said spark plug to said circuit means and arranged to divide the charge of the second capacitor between the spark plug and the outer electrode member respectively, a plurality of impedances one of which is in said branch circuit and connected to the spark plug and another of which is in said circuit means and connected to the outer electrode member, the said impedances insuring the necessary high voltage for firing the spark plug and obtaining an electrical discharge between the first electrode and the outer electrode member, and make and break control means in said circuit means for controlling discharge of said second electrode and said spark plug, the make and break means acting recurrently to apply the potential of the high voltage capacitor to the spark plug and to the outer electrode member substantially simultaneously and the impedances associated with the spark plug and with the outer electrode member insuring the necessary high voltage for firing the spark plug and obtaining electrical discharge between the outer electrode member and the first electrode, recurrent impression of the relatively high voltage producing periodic electrical discharges across the first and outer electrodes causing the continuous low voltage to effect periodic electrical discharges across the first electrode and the inner electrode bringing about periodic increases of fuel pressures.

PAUL T. NIMS.

REFERENCES CITED

The following references are of record in the file of this patent:

UNITED STATES PATENTS

| Number | Name | Date |
|---|---|---|
| 1,679,159 | French | July 31, 1928 |
| 1,871,115 | Cowardin et al. | Aug. 9, 1932 |
| 2,436,090 | Bodine, Jr. | Feb. 17, 1948 |